US012204456B2

(12) United States Patent
Boonstra

(10) Patent No.: US 12,204,456 B2
(45) Date of Patent: Jan. 21, 2025

(54) ARTIFICIAL INTELLIGENCE (AI)/MACHINE LEARNING (ML) TENSOR PROCESSOR

(71) Applicant: SYNOPSYS, INC., Sunnyvale, CA (US)

(72) Inventor: Johannes Boonstra, Deurne (NL)

(73) Assignee: SYNOPSYS, INC., Sunnyvale, CA (US)

( * ) Notice: Subject to any disclaimer, the term of this patent is extended or adjusted under 35 U.S.C. 154(b) by 0 days.

(21) Appl. No.: 18/201,608

(22) Filed: May 24, 2023

(65) Prior Publication Data

US 2024/0020239 A1    Jan. 18, 2024

Related U.S. Application Data

(60) Provisional application No. 63/346,204, filed on May 26, 2022.

(51) Int. Cl.
*G06F 12/1009* (2016.01)
*G06F 7/544* (2006.01)
*G06F 9/30* (2018.01)

(52) U.S. Cl.
CPC ........ *G06F 12/1009* (2013.01); *G06F 7/5443* (2013.01); *G06F 9/30065* (2013.01); *G06F 2212/251* (2013.01)

(58) Field of Classification Search
CPC ............... G06F 12/1009; G06F 7/5443; G06F 9/30065; G06F 2212/251; G06F 2212/1016; G06F 2212/1028; G06F 12/0207; G06N 3/063
See application file for complete search history.

(56) References Cited

U.S. PATENT DOCUMENTS

| | | | |
|---|---|---|---|
| 2008/0133888 A1* | 6/2008 | Arakawa | G06F 9/30105 712/205 |
| 2019/0042241 A1* | 2/2019 | Akin | G06F 9/30043 |
| 2020/0104139 A1* | 4/2020 | Pearce | G06F 9/3851 |
| 2022/0137826 A1* | 5/2022 | Chang | G06F 3/0613 711/154 |
| 2023/0053062 A1* | 2/2023 | Hornung | G06F 9/30109 |
| 2024/0134769 A1* | 4/2024 | Dave | G06F 11/3428 |

\* cited by examiner

*Primary Examiner* — Sean D Rossiter
(74) *Attorney, Agent, or Firm* — LEWIS ROCA ROTHGERBER CHRISTIE LLP

(57) ABSTRACT

A system for executing tensor operations including: a programmable tensor processor; and a memory coupled to the programmable tensor processor, wherein the programmable tensor processor includes: one or more load AGU circuits to generate a first sequence of addresses and read input tensor operands from the memory based on the first sequence of addresses; a datapath circuit to perform the tensor operations on the input tensor operands based on receiving one or more instructions to determine output tensor operands, the one or more instructions being based on a loop iteration count and loop body micro-code instructions defining a loop body of a tensor program stored in the memory, the loop body micro-code instructions being executed in the programmable tensor processor; and a store AGU circuit configured to generate a second sequence of addresses and write the output tensor operands to the memory based on the second sequence of addresses.

20 Claims, 21 Drawing Sheets

```
int in0[3][4]; // a tensor of rank 2 with dimensions 3 and 4, integer data-type
int in1[3];    // a tensor of rank 1 with dimension 3, integer data-type
int out[3][4]; // a tensor of rank 2 with dimensions 3 and 4, integer data-type
// tensor add operation
for (int i = 0; i < 3; i++) {
    for (int j = 0; j < 4; j++) {
        out[i][j] = in0[i][j] + in1[i]    // in1 is 'broadcasted' over [j] dimension
    }
}
```

FIG. 2

```
int in0[3][4]; // a tensor of rank 2 with dimensions 3 and 4, integer data-type
int in1[3];    // a tensor of rank 1 with dimension 3, integer data-type
int out[3][4]; // a tensor of rank 2 with dimensions 3 and 4, integer data-type
// tensor add operation
for (int i = 0; i < 3; i++) {
    int jtmp = in1[j];         // load once from memory and store into a register
    for (int j = 0; j < 4; j++) {
        out[i][j] = in0[i][j] + jtmp     // re-use from a register
    }
}
```

FIG. 4

Tensor Processor: Nested loop structure

Example: sum pooling

```
for it0 // channel loop
    for it1 // spatial loop
        sum = 0
        for it2 // filter loop
            sum += load()
        store(sum)
```

```
for it0
    body0
    if (it0==0) body1
    else body2
    for it1
        body3
        if (it1==0) body4
        else body5
        body6
        for it2
            body7
            body8
            if (it2==last2) body9
            else body10
        if (it1==last1) body11
        else body12
    if (it0==last0) body13
    else body14
body15
```

FIG. 5A

Tensor Processor: Nested loop structure

```
for it0
    if (it0==0)          inst0
    else                 inst1
    inst2
    for it1
        if (it1==0)      inst3
        else             inst4
        inst5
        for it2
            if (it2==0)  inst6
            else         inst7
            inst8
            if (it2==last2) inst9
            else         inst10
        inst11
        if (it1==last1)  inst12
        else             inst13
    inst14
    if (it0==last0)      inst15
    else                 inst16
```

Loop transformation ⇒

```
for it0, it1, it2
    if (it0==0&it1==0&it2==0)              inst0
    if (it0!=0&it1==0&it2==0)              inst1
    if (it1==0&it2==0)                     inst2
    if (it1==0&it2==0)                     inst3
    if (it1!=0&it2==0)                     inst4
    if (it2==0)                            inst5
    if (it2==0)                            inst6
    if (it2!=0)                            inst7
    /*always*/                             inst8
    if (it2==last2)                        inst9
    if (it2!=last2)                        inst10
    if (it2==last2)                        inst11
    if (it1==last1&it2==last2)             inst12
    if (it1!=last1&it2==last2)             inst13
    if (it0==last0&it1==last1&it2==last2)  inst14
    if (it0!=last0&it1==last1&it2==last2)  inst15
    if (it1==last1&it2==last2)             inst16
```

FIG. 5B

Tensor Processor: Nested loop structure

```
for it0, it1, it2
  if (it0==0&it1==0&it2==0)           inst0
  if (it0!=0&it1==0&it2==0)           inst1
  if (it1==0&it2==0)                  inst2 if (it1==0&it2==0)                  inst3
  if (it1!=0&it2==0)                  inst4
  if (it2==0)                         inst5 if (it2==0)                         inst6
  if (it2!=0)                         inst7
  /*always*/                          inst8
  if (it2==last2)                     inst9
  if (it2!=last2)                     inst10 if (it2==last2)                     inst11
  if (it1==last1&it2==last2)          inst12
  if (it1!=last1&it2==last2)          inst13 if (it1==last1&it2==last2)          inst14
  if (it0==last&it1==last1&it2==last2) inst15
  if (it0!=last&it1==last1&it2==last2) inst16
```

Transform if into predicated instructions

==

```
for it0, it1, it2
  inst0.first0
  inst1.nfirst0
  inst2.first1 inst3.first1
  inst4.nfirst1
  inst5.first2 inst6.first2
  inst7.nfirst2
  inst8.always
  inst9.last2
  inst10.nlast2 inst11.last2
  inst12.last1
  inst12.nlast1 inst14.last1
  inst15.last0
  inst16.nlast0
```

FIG. 5C

Tensor Processor: Nested loop structure

Example: sum pooling

```
for it0 // channel loop           for it0, it1, it2
  for it1 // spatial loop           load.always    a
    sum = 0                         mov.first2 sum, a
    for it2 // filter loop          add.nfirst2 sum, sum, a
      sum += popin                  store.last2 sum
    pushout sum
```

FIG. 6

```
struct tensor_program {
    struct {
        ...
    } inputs_agu[IAGU];   // Structure defining load address generation
    patterns for IAGU input operands
    struct {
        ...
    } output_agu[OAGU];   // Structure defining load address generation
    patterns for OAGU output operands
    int loop_iterations[ITER];  // Array defining the ITER nested loop
    levels
    struct {
        ...
    } inner_body[INSTR];  // Array of INSTR instructions to be executed
    in the inner loop
};
```

FIG. 8

```
struct tensor_instr {
    pred_t      pred;       // predicate condition
    fu_t        fu;         // function unit allocation
    int         cyc;        // relative cycle to execute an instruction
    opcode_t    op;         // operation to be performed
    operands_t  rgs[];      // input and output operands
}
```

FIG. 9

```
PReLU example poppars.first2                  @0
    popin.always  vr0, brw1, brb0   @1
    selpnh.always vr1, vr0, brw2, brh1  @2
    scale.always  vr2, vr1          @ 3 (2 cycle latency)
    pushout.always vr2, brb1        @5 for all channel
    poppars(3)
    for all spatial
        a = popin (brw1, brb0)   Explicit cycle annotation
        b = selpnh (a, brw2, brh1)
        c = scale(b)
        pushout(c)
```

| Cyc | par | in  | out  | alu    | mpy | vr0 | vr1 | vr2 | br. |
|-----|-----|-----|------|--------|-----|-----|-----|-----|-----|
|     |     | pop |      |        |     |     |     |     |     |
|     |     |     |      | selpnh |     |     |     |     |     |
|     |     |     |      |        | mpy |     |     |     |     |
|     |     |     | push |        |     |     |     |     |     |
|     |     |     |      |        |     |     |     |     |     |

FIG. 12A

PReLU example

```
poppars.first2    3                    @0
popin.always      a, brw1, brb0        @1
selpnh.always     b, a, brw2, brh1     @2
scale.always      c, b                 @3
pushout.always    c, brb1              @5
```

LUT example

```
poppars.first2    3
popin.always      a, brw1, brb0      @0
lut0.always       b, a               @1
lut1.always       b, a               @2
mac0h.always      c, b               @3
mac1h.always      d, c               @4
pushout.always    d, brb1            @6
                                     @8
``` functional units { parin, fmin, alu, mpy, fmout }

LUT example, improved schedule

| | | |
|---|---|---|
| poppars.first2 | 3 | @0 |
| popin.always | a, brw1, brb0 | @1 |
| lut0.always | b, a | @2 |
| lut1.always | b, a | @3 |
| mac0h.always | c, b | @4 |
| mac1h.always | d, c | @7 |
| pushout.always | d, brb1 | @9 | parin
fmin
alu  } functional units
mpy
fmout

- Execution controlled over register interface or descriptors in memory

- Example tensor accelerator descriptor:

```
struct descriptor_t {
    agu_t        tens_in[2];   // Address sequences for 2 input tensors
    agu_t        tens_out;     // Address sequence for 1 output tensor
    int32_t      scalar[8];    // 8 scalar inputs/outputs
    int32_t*     pchan;        // pointer to per-channel parameters
    ucode_t      code;         // loop body micro-code
    iter_t       loops;        // field describing loop nesting
    descriptor_t* next;        // pointer to next operation in list
};
```

FIG. 14

ARTIFICIAL INTELLIGENCE (AI)/MACHINE LEARNING (ML) TENSOR PROCESSOR

RELATED APPLICATION

This application claims priority to and the benefit of U.S. Provisional Patent Application No. 63/346,204, filed on May 26, 2022, in the United States Patent and Trademark Office, the entire content of which is incorporated by reference herein.

TECHNICAL FIELD

The present application generally relates to an artificial intelligence (AI)/machine learning (ML) tensor processor. More particularly, the present disclosure relates to a system and method for providing tensor operations using an AI/ML tensor processor.

BACKGROUND

Tensors are mathematical objects that can be used to describe physical properties, similar to scalars and vectors. Tensors may be considered as generalizations of scalars and vectors. For example, a scalar is a zero rank tensor, and a vector is a first rank tensor. The inputs, outputs, and transformations within neural networks may be represented using tensors, and as a result, neural networks regularly utilize tensor operations. For example, a tensor may be the primary data structure used by neural networks, such as for storing the weights of connections between layers of neural networks and for storing the values propagated through neural networks.

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

In one or more embodiments, a system for executing tensor operations, the system including: a programmable tensor processor; and a memory coupled to the programmable tensor processor, wherein the programmable tensor processor includes: one or more load address generation unit (AGU) circuits configured to generate a first sequence of addresses and read input tensor operands from the memory based on the first sequence of addresses; a datapath circuit configured to perform the tensor operations on the input tensor operands based on receiving one or more instructions to determine output tensor operands, the one or more instructions being based on a loop iteration count and loop body micro-code instructions defining a loop body of a tensor program stored in the memory, the loop body micro-code instructions being executed in the programmable tensor processor; and a store AGU circuit configured to generate a second sequence of addresses and write the output tensor operands to the memory based on the second sequence of addresses.

In one or more embodiments, the one or more load AGU circuits are configured to generate the first sequence of addresses based on receiving one or more input address generation parameters based on the tensor program stored in the memory, and to generate the second sequence of addresses based on receiving one or more output address generation parameters based on the tensor program stored in the memory.

In one or more embodiments, the tensor operations include one or more selected from a group of arithmetic operations, look-up-table (LUT) based operations, multiply and multiply-accumulate operations, transpose and shuffle operations, and/or reduction operations.

In one or more embodiments, the tensor program is decomposed into an input operand memory loads section, a loop sequencing section, a loop body microcode executing across functional circuits of the datapath circuit, and an output operand memory store section, wherein the loop sequencing section of the tensor program includes the loop iteration count of the tensor program and a plurality of predicate instructions representing the loop body microcode instructions, and wherein the loop iteration count is a set value.

In one or more embodiments, the first sequence of addresses are generated based on the input operand memory loads section of the tensor program and the second sequence of addresses are generated based on the output operand memory store section of the tensor program.

In one or more embodiments, the programmable tensor processor further includes: a nested loop sequence circuit configured to iterate loops in the tensor program based on the loop iteration count of the tensor program and to generate a stream of condition codes; a predicate filter circuit configured to filter a subset of the loop body micro-code instructions, based on the stream of condition codes from the nested loop sequencer circuit, and to generate filtered instructions including corresponding predicate instructions; and a pending instruction tracker circuit configured to track the filtered instructions, from the predicate filter circuit, in an instruction queue, and to issue the one or more instructions of the filtered instructions to the datapath circuit, the one or more instructions are at a head of the instruction queue.

In one or more embodiments, the predicate filter circuit is configured to filter one or more instructions from the loop body micro-code instructions that fail a condition check based on the stream of condition codes received from the nested loop sequencer circuit.

In one or more embodiments, the pending instruction tracker circuit is further configured to maintain a table of scheduled instructions including the instruction queue, to shift the table of scheduled instructions to remove the one or more instructions after the one or more instructions from the head of the instruction queue are issued to the datapath circuit, and to accept and adds a new iteration of the filtered instructions to the table of scheduled instructions, wherein the new iteration of the filtered instructions that are added to the table of scheduled instructions are free of hazards.

In one or more embodiments, the datapath circuit includes: one or more load functional circuits configured to load the input tensor operands through the one or more load AGU circuits; one or more arithmetic-logic functional circuits configured to perform the tensor operations; one or more multiplier functional circuits; at least one storage circuit configured to store the output tensor operands through the store AGU circuit and intermediate results of the tensor operations; and at least one register files circuit to store intermediate results of the tensor operations.

In one or more embodiments, a method for executing tensor operations in neural network, the method including: generating, by a processor, a first sequence of addresses; reading, by the processor, input tensor operands from a memory coupled to the processor based on the first sequence of addresses; iterating loops in a tensor program stored in the memory and generating a stream of condition codes by the processor; filtering, by the processor, a subset of micro-code instructions from loop body micro-code instructions of the tensor program, based on the stream of condition codes and generating filtered instructions; performing, by the processor, the tensor operations on the input tensor operands based on one or more instructions of the filtered instructions to determine output tensor operands; generating, by the processor, a second sequence of addresses; and writing, by the processor, the output tensor operands to the memory based on the second sequence of addresses.

In one or more embodiments, the method further includes: tracking, by the processor, the filtered instructions in an instruction queue; and issuing, by the processor, the one or more instructions to a datapath circuit of the processor, the one or more instructions are at a head of the instruction queue.

In one or more embodiments, the method further includes: maintaining, by the processor, a table of scheduled instructions including the instruction queue; and shifting, by the processor, the table to remove the one or more instructions after the one or more instructions from the head of the instruction queue are issued to the datapath circuit, and accepting and adding, by the processor, a new iteration of the filtered instructions to the table of scheduled instructions, wherein the new iteration of the filtered instructions that are added to the table of scheduled instructions are free of hazards.

In one or more embodiments, the processor is configured to iterate the loops in the tensor program based on a loop iteration count of the tensor program, wherein the loop body micro-code instructions defines a loop body of the tensor program and are executed in the processor, wherein the filtered instructions includes a plurality of predicate instructions representing the subset of the micro-code instructions that are filtered, and wherein two or more predicate instructions from among the plurality of predicate instructions are allocated to a same functional circuit at a same cycle based on predicates in the two or more predicate instructions being mutually exclusive.

In one or more embodiments, the first sequence of addresses are generated based on receiving one or more input address generation parameters based on the tensor program, and wherein the second sequence of addresses are generated based on receiving one or more output address generation parameters based on the tensor program.

In one or more embodiments, the tensor operations include one or more selected from a group of arithmetic operations, look-up-table (LUT) based operations, multiply and multiply-accumulate operations, transpose and shuffle operations, and/or reduction operations.

In one or more embodiments, a non-transitory computer readable medium including stored instructions, which when executed by a processor, cause the processor to generate a digital representation of a tensor processor circuit including: one or more load address generation unit (AGU) circuits configured to generate a first sequence of addresses and read input tensor operands from a memory coupled to the tensor processor circuit based on the first sequence of addresses; a datapath circuit configured to perform tensor operations on the input tensor operands based on receiving one or more instructions to determine output tensor operands, the one or more instructions being based on a loop iteration count and loop body micro-code instructions defining a loop body of a tensor program stored in the memory, the loop body micro-code instructions being executed in the tensor processor circuit; and a store AGU circuit configured to generate a second sequence of addresses and write the output tensor operands to the memory based on the second sequence of addresses.

In one or more embodiments, the non-transitory computer readable medium of claim 16, wherein the tensor processor circuit further includes: a nested loop sequence circuit configured to iterate loops in the tensor program based on the loop iteration count of the tensor program and to generate a stream of condition codes; a predicate filter circuit configured to filter a subset of the loop body micro-code instructions, based on the stream of condition codes from the nested loop sequencer circuit, and to generate filtered instructions including corresponding predicate instructions; and a pending instruction tracker circuit configured to track the filtered instructions, from the predicate filter circuit, in an instruction queue, and to issue the one or more instructions of the filtered instructions to the datapath circuit, the one or more instructions are at a head of the instruction queue.

In one or more embodiments, the datapath circuit includes: one or more load functional circuits configured to load the input tensor operands through the one or more load AGU circuits; one or more arithmetic-logic functional circuits configured to perform the tensor operations; at least one storage circuit configured to store the output tensor operands through the store AGU circuit and intermediate results of the tensor operations; and at least one register files circuit to store intermediate results of the tensor operations.

In one or more embodiments, the tensor program is decomposed into an input operand memory loads section, a loop sequencing section, a loop body execution on across functional units section, and an output operand memory store section, wherein the loop sequencing section of the tensor program includes the loop iteration count of the tensor program and a plurality of predicate instructions representing the loop body micro-code instructions, and wherein the loop iteration count is a set value.

In one or more embodiments, the tensor operations include one or more selected from a group of arithmetic operations, look-up-table (LUT) based operations, multiply and multiply-accumulate operations, transpose and shuffle operations, and/or reduction operations.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 2 illustrates a pseudo-code of a tensor 'add' operation on two tensors, according to one or more embodiments.

FIG. 4 illustrates another embodiment of the decomposed version of the pseudo-code of FIG. 2, according to one or more embodiments.

FIG. 5A illustrates a tensor program including input tensor operands, according to one or more embodiments.

FIG. 5B illustrates a program with all if-the-else bodies of FIG. 5A moved to the inner loop, according to one or more embodiments.

FIG. 5C illustrates a program where each "if" statement incorporating instructions line of FIG. 5B are mapped onto a predicated instruction, according to one or more embodiments.

FIG. 6 illustrates a sum pooling code, according to one or more embodiments.

FIG. 8 illustrates a tensor program that is decomposed into a plurality of sections, according to one or more embodiments.

FIG. 9 illustrates a pseudo code for encoding the instructions of a functional unit, according to one or more embodiments.

FIG. 12A illustrates a C-pseudocode representing a parametric rectified linear unit (PReLU) and also illustrates an instruction schedule, according to one or more embodiments.

FIG. 14 illustrates a tensor operation task descriptor including sections for input tensor loading, loop control, micro-code, and output tensor storing, according to one or more embodiments.

DETAILED DESCRIPTION

Figure 1:
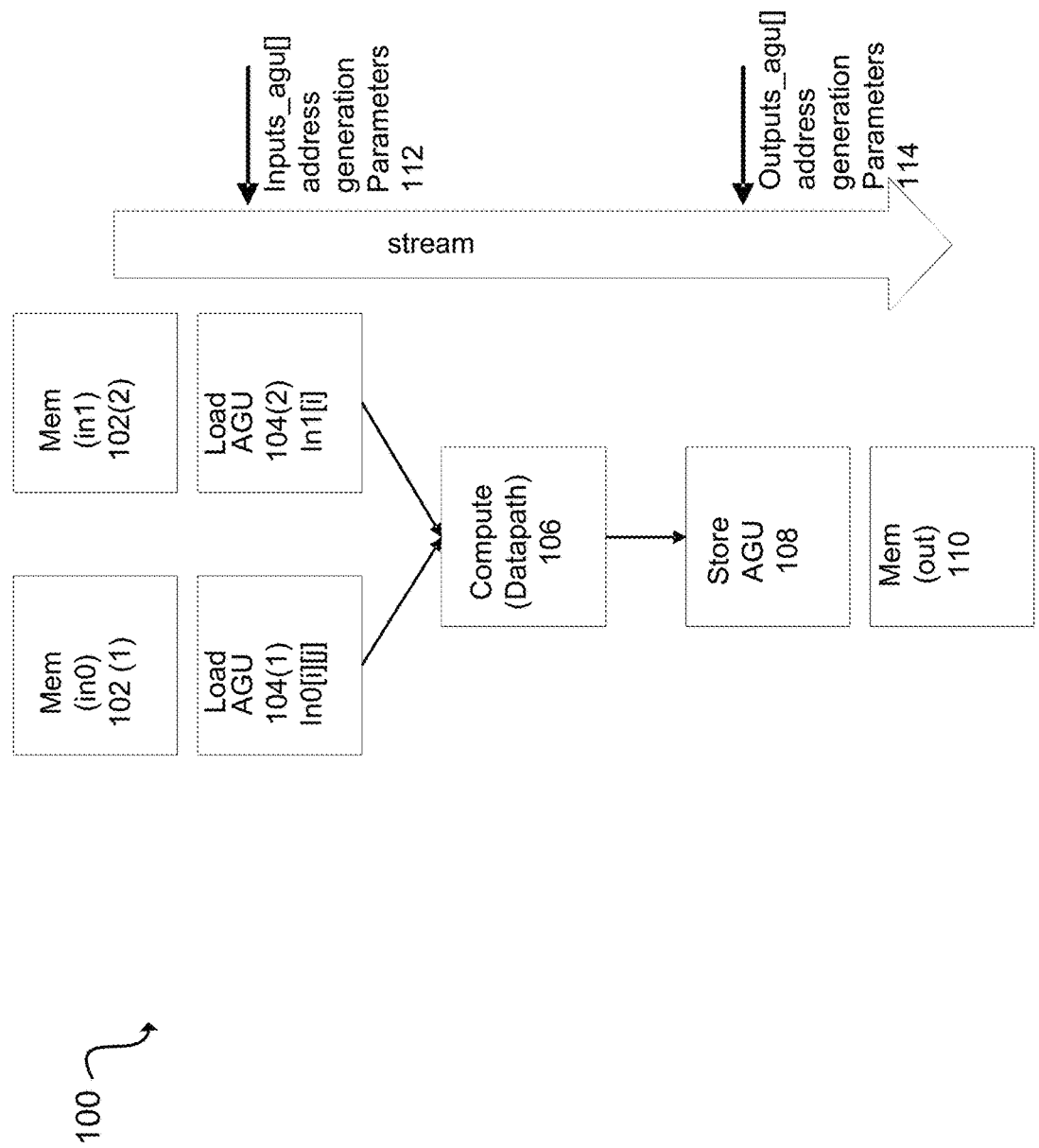
FIG. 1 illustrates building blocks to represent a decomposed version of a tensor operation on two tensors in an artificial neural network (ANN), according to one or more embodiments.

Aspects of the present disclosure relate to an artificial intelligence (AI)/machine learning (ML) tensor processor.

State-of-the-art Artificial Intelligence (AI)/Machine Learning (ML) applications rely on vector, matrix, and tensor operations. In order to process data by an artificial neural network (NN), the architecture of the artificial neural network may be converted into intermediate primitive forms. In ML, a primitive may also be the smallest unit of processing available to a programmer of a particular machine, or can be an atomic element of an expression in a language. These primitive may represent underlying computations such as tensor additions, tensor multiplications, activation functions (e.g., a parametric rectified linear unit or PReLU), and the like. These primitives can be optimized for computation on some given hardware and once implemented, can be reused or referenced by additional models.

For example, different activation functions of an artificial neural network (ANN) may be represented by different sets of primitive compare and select operations. In an ANN, normalization layers may require yet another set of primitive operations. Also, new types of operations are constantly emerging through academic research (e.g., different activation functions and different types of neural network layers).

AI/ML applications or an ANN includes layers of functions. The inputs and outputs of a layer of an ANN can be expressed as tensors (e.g., matrices, vectors, and scalars are a subset of tensors). In addition, a layer may include trainable parameters (e.g., weights) whose values are set during the process of training the ANN, and the parameters for a given layer may also be expressed as a tensor. In ML, a tensor is a way of embedding high-dimensional data into a multi-dimensional array (e.g., a data type) suitable for ANNs. Tensors may represent images, movies, volumes, sounds, and relationships among words and concepts in a unified way (e.g., as a collection of numbers that may be organized along n-different dimensions).

Various AI layer functions (e.g., activation functions, normalizations, etc.) can be expressed using a common instruction set architecture (ISA) in which multiple instructions form a program (e.g., a computer program). The ISA may represent instructions supported by an AI processor. In such a case, flexibility may be desired because new types of functions are constantly emerging through academic research, and the ISA may allow these new types of functions to be implemented by the AI processor.

High throughput may be desired in AI processors, and therefore, AI processors use single instruction multiple-data (SIMD) that processes vectors (or tensors) of data and very-large instruction word (VLIW) that issues a bundle of instructions across multiple functional units, one instruction from the bundle per unit, per cycle. In AI tensor operations, the instruction program flow may not depend on tensor values (i.e., the program control flow will not depend on the data values), and memory access sequences are known up-front.

In AI/ML applications (e.g., using computer software (SW)), primitive tensor operations can be expressed by a single set of nested 'for' loops. When, multiple primitive operation are combined in a sequence (e.g., a computer program), 'if-then-else' statements provide conditional execution of primitive operations. For example, a tensor program (e.g., representing a neural network) may include one or multiple input tensor operands, and, as a result of its tensor processing, produce one or multiple tensor output operands. The operation on the tensor is characterized by a set of nested loops and the loop body to be executed, and the 'if-then-else' may be used to control the 'for' loops (e.g., using an 'if' statement to detect when the for loop has finished iterating through a dimension of an input tensor).

Many modern computer processors have deep instruction pipelines in which instructions are queued for execution. A conditional statement (such as an 'if' statement) is typically represented in the ISA of a processor as a conditional branch or conditional jump instruction, where the next instruction to be executed by the processor depends on the result of evaluating the condition (e.g., execute the instructions of branch A if the condition is true and execute instructions of branch B if the condition is false). Because the next instruction to be executed cannot be known for certain until the processor evaluates the condition, the processor must either wait until the condition is executed (leaving the instruction pipeline empty, and thereby wasting compute cycles waiting until the determined next instruction is retrieved from memory and inserted into the queue) or the processor may predict or guess which branch will be taken (in which case there may be wasted effort in circumstances where a branch predictor circuit of the processor made an incorrect prediction).

In one or more embodiments of the present disclosure, the multi-level nested loop body is refactored (or decomposed) to use multi-level predication. This avoids the use of conditional statements (or 'if' statements) in the loop, thereby improving throughput of an AI tensor processor according to embodiments of the present disclosure. In computer architecture, predication is a feature that provides an alternative to conditional transfer of control, as implemented by conditional branch machine instructions. Predication works by having conditional (e.g., predicated) non-branch instructions associated with a predicate, a Boolean value used by the instruction to control whether the instruction is allowed to modify the architectural state or not. For example, a predicate is a statement (or function) that returns either true or false. If the predicate specified in the instruction is true, the instruction modifies the architectural state; otherwise, the architectural state is unchanged. For example, a predicated move instruction (a conditional move) will only modify the destination if the predicate is true. Thus, instead of using a conditional branch to select an instruction or a sequence of instructions to execute based on the predicate that controls whether the branch occurs (e.g., by performing a jump to another part of the program based on the evaluation of the predicate), the instructions to be executed are associated with that predicate, so that they will be executed, or not executed, based on whether that predicate is true or false. Regardless of whether the predicate of a predicated instruction is true or false, after executing the predicated instruction, the processor continues by executing the next instruction of the program (e.g., the predicated instruction does not cause a jump). In one or more embodiments, the predicates may depend on, for example, the nested loop (e.g., nested "for" loop) variables (e.g., first or last or odd or even in the inner or outer loop).

One or more embodiments of the present disclosure provides a processor (e.g., a tensor processor) or a programmable tensor processor to accelerate AI/ML tensor-based operations while retaining flexibility as found in other programmable solutions. A programmable processor or a programmable tensor processor may also provide flexibility to support various operations (e.g., tensor operations, neural network layers, activation functions, and the like), now and in the future, as new types of operations emerge over time.

Technical advantages of the present disclosure include, but are not limited to an efficient, low area, high throughput, hardware or a programmable tensor processor (e.g., to be used in edge inference processors) for performing efficient and flexible tensor operation acceleration, such as for use in implementing neural networks (NN). For example, in order to efficiently perform tensor operations in NN, one or more embodiments of the present disclosure provide a programmable tensor processor, in which a software (SW) program is decomposed into at least four functions (e.g., load/store, address generation, loop sequencing, predicate filtering, compute, and the like). The SW program is executed by mapping the components of the SW program on modules using a streaming paradigm for communication between these modules. Loop structures of the SW program are predefined. In the programmable tensor processor according to some embodiments, a micro-code of the SW program is explicitly scheduled by a compiler, free of conflicts for a single iteration of the inner loop of the SW program, so free of intra-iteration body hazards (e.g., free of resource conflicts, such as, for example, free of register read-after-write hazards, and functional unit allocation conflicts). The micro-code program may define the inner loop body of the SW program that will be executed in the programmable tensor processor in every inner loop iteration.

Technical advantages of the present disclosure also include pipelined reading of new program and execution of current program. Further, the a programmable tensor processor of the present disclosure provides a fully predictable execution of the tensor operations (e.g., without the need to evaluate conditional branch instructions). For example, because in the programmable tensor processor of the present disclosure, there is no need for evaluating conditional branch instructions (e.g., the predicated statements eliminate the need for a branch predictor), the programmable tensor processor of the present disclosure may occupy less area in an integrated circuit (IC) and consume less power.

In one or more embodiments of the present disclosure, predication is used to enable a subset of the instructions in the loop body. In one or more embodiments, the predications depend on nested loop variables only (e.g., first/last/even/odd on outer/middle/inner loop). In another embodiment, mutually exclusive predicates can enable different instructions on the same slot.

In one or more embodiments, the decomposed SW program can be executed on an apparatus (e.g., a processor (e.g., a tensor processor)) with a similarly decomposed structure, in which devices (e.g., circuits) communicate using a streaming paradigm.

FIG. 1 illustrates building blocks to represent a decomposed version of a tensor operation on two tensors in an ANN.

As shown in the data flow of the tensor processor 100 of FIG. 1, two input tensors (in0 and in1) may be stored in one or more locations of a memory 102 in communication with the tensor processor 100. In one or more embodiments of the present disclosure, the program flow or the control flow do not depend on the values in the input tensors in0, in1. In other words, the control flow is independent of the data flow.

In one or more embodiments, when an input address generation parameters instruction 112 is received at one or more load address generation unit (AGU) circuits 104(1) and 104(2), the two load AGU circuits 104(1) and 104(2) may read data from the memory 102 (102(1), 102(2)) and stream the data to a compute or a datapath circuit 106. The datapath circuit 106 performs computation on the input tensors (in0 and in1) based on one or more instructions received at the datapath circuit 106. The datapath circuit 106 forwards the result of the computation to the store AGU circuit 108. The store AGU circuit 108 may receive an output address generation parameters instruction 114 and based on receiving the output address generation parameters instruction 114, the store AGU circuit 108 may write results to one or more locations 110 of a memory (e.g., the memory 102). For example, in this case, the 'body' in the datapath circuit 106 specifies one or more operations (e.g., a tensor operation such as an arithmetic operation) to be performed on the input tensors (in0 and in1) and the datapath circuit 106 can execute the operations only when input tensors (in0 and in1) data are available (e.g., from the two load AGU circuits 104(1) and 104(2)). Parameters to these functions are known a-priori, e.g., specified as part of the program being executed, either statically at the time of compiling the program or dynamically set when initially running the program.

Figure 3:
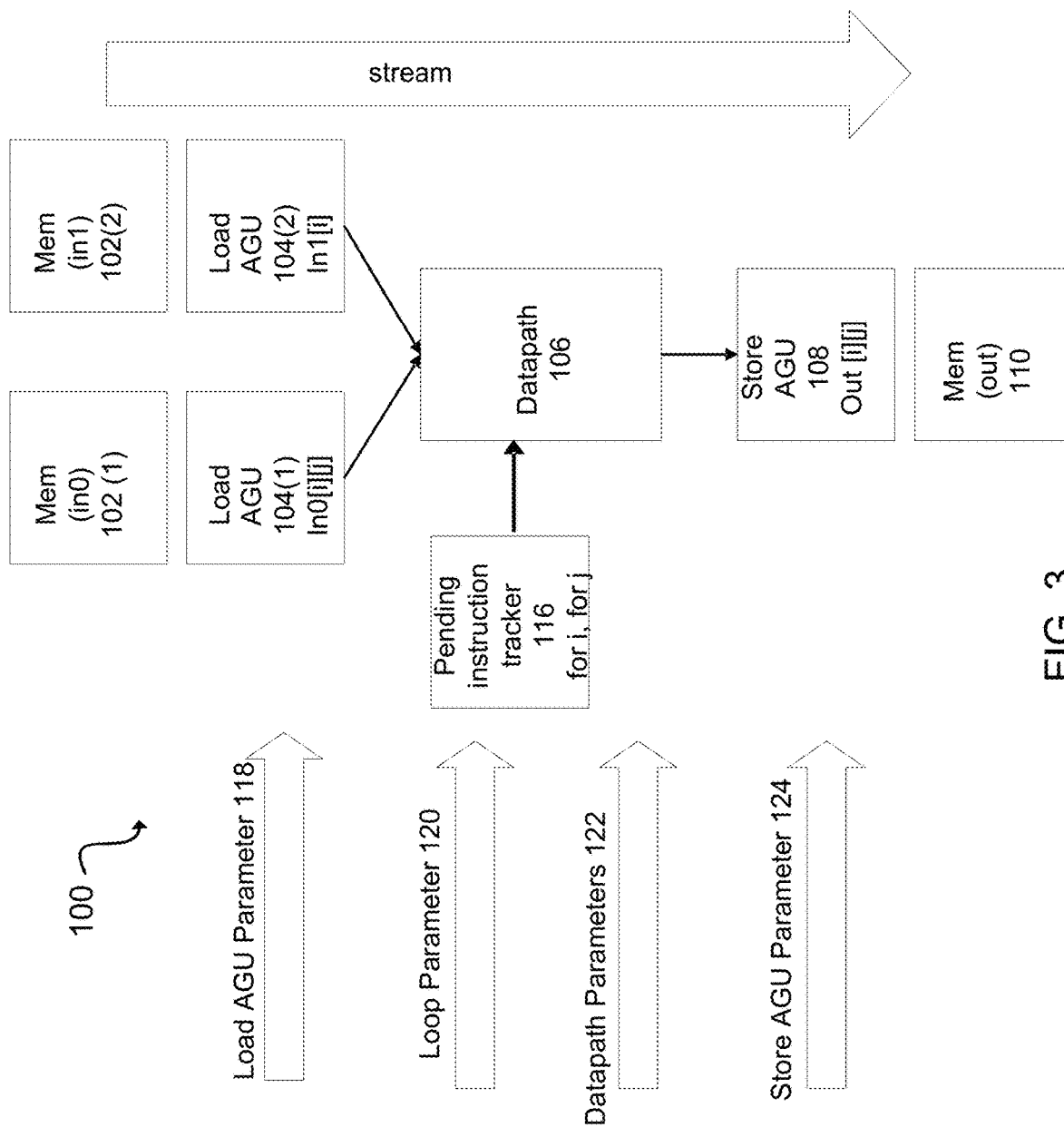
FIG. 3 illustrates building blocks to represent a decomposed version of the tensor operation on two tensors of FIG. 2, according to one or more embodiments.

FIG. 2 to FIG. 4 provide an example of tensor operations in AI/ML. FIG. 2 illustrates a pseudo-code of a tensor 'add' operation on two tensors, FIG. 3 illustrates building blocks to represent a decomposed version of the tensor operation on two tensors of FIG. 2, and FIG. 4 illustrates another embodiment of the decomposed version of the pseudo-code of FIG. 2.

As discussed above, AI functions operate on tensor operands. Each tensor has a rank, which is the number of dimensions in the tensor data. The C pseudo-code of FIG. 2 illustrates a tensor 'add' operation on two tensors (in0 and in1) of unequal ranks 2 and 1. The add operation on the tensor produces a tensor (out) of rank 2.

For example, in FIG. 2, the program flow does not depend on the values in tensors in0 and in1 (the control flow is independent of the data or data flow). Loop boundaries are known up-front based on the dimensions of the tensors (in0 is a tensor of rank 2 with dimensions 3 and 4 and in1 is a tensor of rank 1 with dimension 3, and therefore i iterates 3 times; j iterates 3*4 times) and memory accesses sequences (e.g., load/store) are also known up-front (e.g., [i][j], 3*[i]). Given the above observations, the program as shown in FIG. 2 can be decomposed into a stream of independent functions (e.g., 118, 120, 122, and 124) as illustrated in FIG. 3.

In the example embodiment of FIG. 3, two input tensors (in0 and in1) may be stored in one or more locations of a memory 102. In one or more embodiments of the present disclosure, the program flow or the control flow (which is represented in FIG. 3 by the instructions 118, 120, 122, and 124, and a pending instruction tracker circuit 116) does not depend on the values in the input tensors (in0, in1). In other words, the control flow is independent of the data flow. In FIG. 3, the data flow is represented by the memory 102 (102(1), 102(2)), the one or more load AGU circuits 104 (104(1), 104(2)), the datapath circuit 106, a store AGU circuit 108, and the one or more locations 110 of a memory (e.g., memory 102) and the program flow or control flow may be represented by the instructions 118, 120, 122, and 124, and the pending instruction tracker circuit 116.

In one or more embodiments in FIG. 3, when a load AGU parameter instruction 118 (e.g., which is part of the control flow) is received at the load AGU circuits 104(1) and 104(2), the two load AGU circuits 104(1) and 104(2) may read data (in0 [i][j], in1 [i]) from the memory 102 (102(1), 102(2)) and stream the data to the datapath circuit 106. The datapath circuit 106 performs computation on the input tensors (in0 [i][j], in1 [i]) based on one or more instructions received at the datapath circuit 106. For example, a pending instruction tracker circuit 116 may receive a loop parameter instruction 120 and a datapath parameter instruction 122 (e.g., a micro-code for loop body), and based on the loop parameter instruction 120 and the datapath parameter instruction 122, the pending instruction tracker circuit 116 may issue a bundle of instructions into the datapath circuit 106, one instruction from the bundle per functional unit per loop iteration. For example, in this case, the 'body' (e.g., the datapath parameter instruction 122 or the micro-code for loop body) may specify the tensor operation (e.g., an arithmetic operation) to be performed on the data (in0 [i][j], in1 [i]) and can execute only when input data is available. Parameters to these functions are known a-priori (e.g., based on the dimensions of the input).

The datapath circuit 106 forwards the result of the computation to the store AGU circuit 108. The store AGU circuit 108 may receive an output address generation parameters instruction 114 (e.g., which is part of the control flow) and based on receiving the output address generation parameters instruction 114, the store AGU circuit 108 may write results to one or more locations 110 of a memory (e.g., memory 102).

As shown in the pseudo-codes of FIG. 2 and FIG. 4, the first input tensor "in0" is a tensor of rank 2 with dimensions 3 and 4, integer data-type, the second input tensor "in1" is a tensor of rank 1 with dimension 3, integer data-type, and the output tensor "out", which represents the result of a tensor operation (e.g., an arithmetic operation, such as "add") between the first input tensor "in0" and the second input tensor "in1", is a tensor of rank 2 with dimensions 3 and 4, integer data-type. The values of the first input tensor "in0" and the second input tensor "in1" may be loaded from the memory 102 once and stored in a temporary register.

In the pseudo-code of FIG. 2, the tensor operation (e.g., the "add" operation) between the first input tensor "in0" and the second input tensor "in1", can be expressed by a single set of nested 'for' loops. In the example of FIG. 2, each "in1" value is referred to four times. An efficient solution may only load each value from the memory 102 (102(1), 102(2)) once and store it into a temporary register, as shown in FIG. 4. In one or more embodiments, the micro-code program defining the inner loop body will be executed every inner loop iteration. The subset of executed instruction may be defined by a set of condition codes, which depend on the nested loop iteration counts.

FIG. 5A illustrates a tensor program including input tensor operands.

For example, in general, a tensor program includes input tensor operands, a set of loops (e.g., "for loops"), conditions (e.g., "if-the else" conditions), and bodies as illustrated in FIG. 5A. A body may include one or multiple instructions from the ISA. As discussed above, various AI layer functions (e.g., activation functions, normalizations, etc.) can be expressed using an ISA in which multiple instruction form a program (e.g., a computer program). In a tensor program, 'if-the-else' conditions only refer to the loop counters, comparing to the start or end condition of a loop. In one or more embodiments, a loop counter may be a counter that is maintained by the "datapath" circuit of the programmable tensor processor. The loop counter may be incremented at the end of each loop iteration. In one or more embodiments, a separate counter is maintained for each (nested) loop that is incremented at the end of each loop iteration. For example, in FIG. 5A, the condition for the execution of "body 3" is identical to the condition for the execution of "body 6". In FIG. 5A, the example on the right illustrates how an AI 'sum pooling' operation may map on the loop structure on the left side of FIG. 5A (e.g., with particular operations mapped onto the "body" placeholders.

The program as shown in FIG. 5A can be transformed into a program with all if-the-else bodies being moved to the inner loop, as illustrated in FIG. 5B.

For example, FIG. 5B illustrates a program with all if-the-else bodies of FIG. 5A moved to the inner loop and FIG. 5C illustrates a program where each line of FIG. 5B containing incorporating an "if" statement is mapped onto a predicated instruction.

For example, in one or more embodiments, each "if" statement incorporating an instructions line (as shown in the right hand side of FIG. 5B) can be mapped onto a predicated instruction from the ISA, thereby avoiding branches in the control flow, as shown in FIG. 5C.

TABLE 1

| | |
|---|---|
| never | never execute an instruction (No Operation) |
| first0 | only execute in first iteration of inner loop |
| first1 | only execute in first iteration of middle loop |
| first2 | only execute in first iteration of outer loop |
| nfirst0 | execute in all iterations of inner loop, except first |
| nfirst1 | execute in all iterations Of middle loop, except first |
| nfirst2 | execute in all iterations Of outer loop, except first |
| last0 | only execute in last iteration of inner loop |
| last1 | only execute in last iteration of middle loop |
| last2 | only execute in last iteration of outer loop |
| nlast0 | execute in all iterations of inner loop, except last |
| nlast1 | execute in all iterations of middle loop, except last |
| nlast2 | execute in all iterations of outer loop, except last |
| even | execute every even iteration |
| odd | execute every odd iteration |
| always | always execute |

Referring back to FIG. 5C, FIG. 5C shows how these predicate conditions (e.g., of Table 1) map to if-then structures. For example, the predicate "never" indicates an instruction should never be executed (e.g., this can be used to identify an unused instruction slot in the micro-code), the predicate "always" indicates to always execute the instruction (e.g., do not apply filtering), the predicate "even" executes the instruction every other (e.g., even) iteration, regardless of the loop counters (e.g., this can be used to avoid register conflicts across loop iterations), and the predicate "odd" executes the instruction every other (e.g., odd) iteration, regardless of the loop counters (e.g., this can be used to avoid register conflicts across loop iterations).

FIG. 6 illustrates code for implementing a part of a sum pooling operation (an operation commonly implemented in a layer of a neural network) as pseudocode in both an implementation using nested loops and an implementation using predicated instructions. For example, the sum pooling code shown in FIG. 6, illustrates how an AI sum pooling operation maps onto a set of predicated instructions (loops not shown).

Figure 7A:
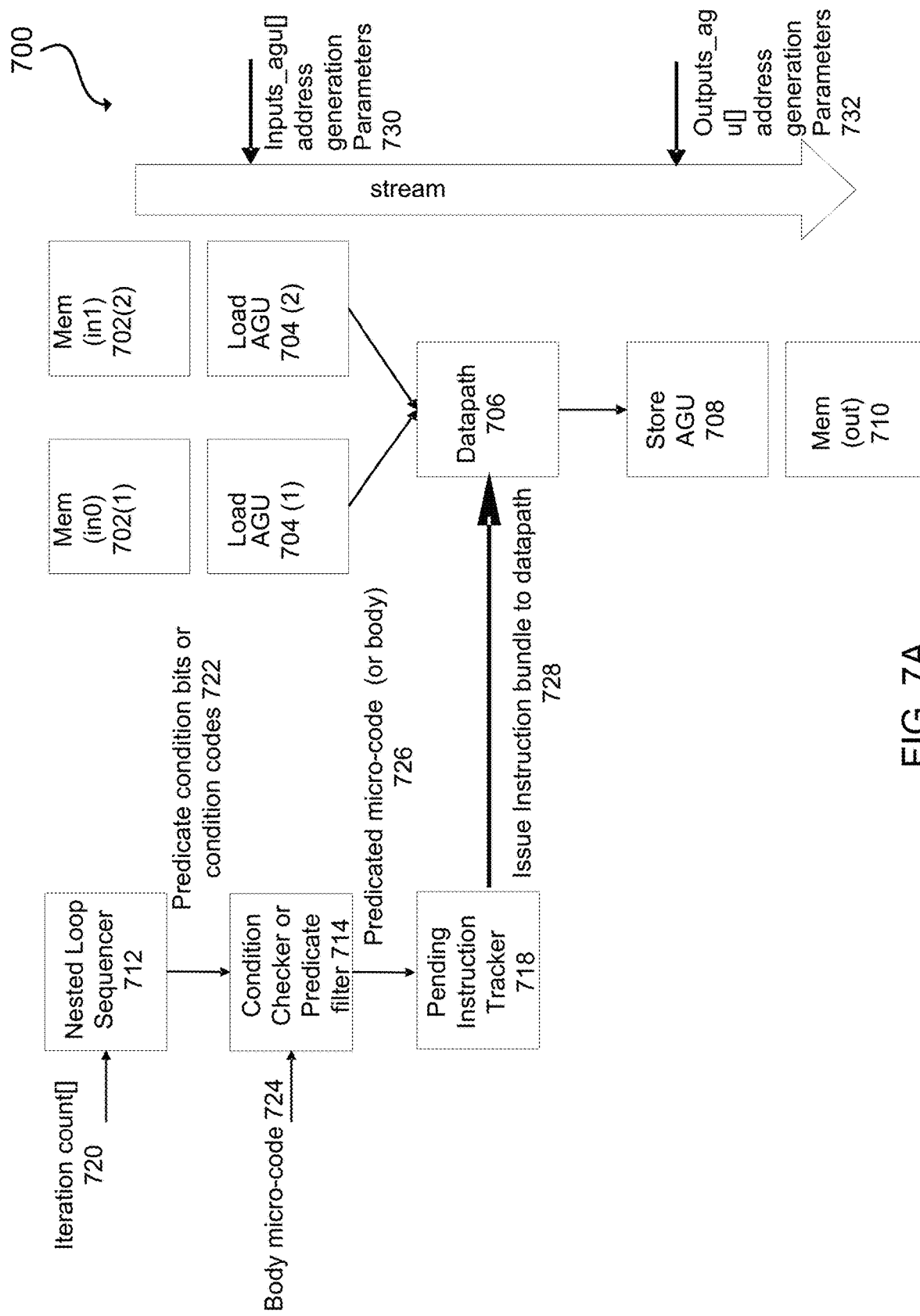
FIG. 7A illustrates a programmable tensor processor, according to one or more embodiments.
Figure 7B:
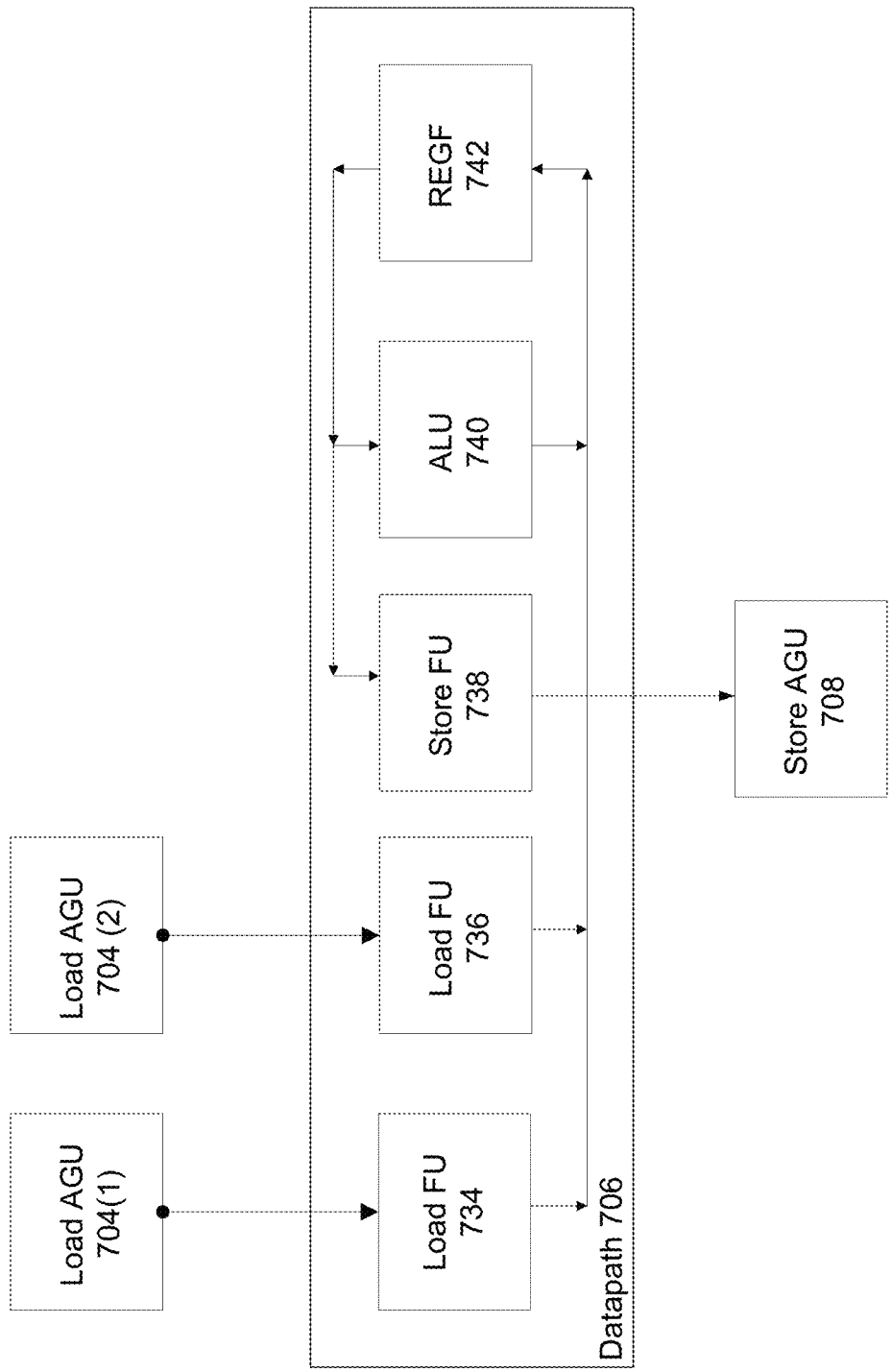
FIG. 7B illustrates an example datapath with a plurality of functional units, according to one or more embodiments.

FIG. 7A illustrates a programmable tensor processor (or a streaming tensor processor) according to one or more embodiments. FIG. 7B illustrates an example datapath of the programmable tensor processor of FIG. 7A.

The programmable tensor processor 700 provides an efficient and flexible tensor operation acceleration.

The programmable tensor processor 700 includes load AGU circuits (704(1), 704(2)), a datapath circuit 706, a store AGU circuit (e.g., 708), a nested loop sequencer circuit 712, a predicate filter circuit 714, and a pending instruction tracker circuit 718.

The load AGU circuits (704(1), 704(2)) may read data from the memories 702(1) and 702(2) and the store AGU circuit 708 may store the computation result or the output of the datapath circuit 706 in another memory 710. In the programmable tensor processor 700 of the present application, multiple circuits (e.g., 704(1), 704(2), 706, 708, 712, 714, 718) are connected via streaming interfaces (e.g., a data streaming protocol, such as, for example, a point-to-point communication protocol for communicating data from an initiator port to a target port).

In the programmable tensor processor 700 of the present disclosure, a SW program is decomposed into a plurality of sections, for example, the input operand memory load section (e.g., executed by the load AGU circuits 704(1), 704(2) of FIG. 1), the loop sequencing section (e.g., executed by the nested loop sequencer circuit 712, the predicate filter circuit 714, and the pending instruction tracker circuit 718), the loop body execution on across functional units section (e.g., executed by the datapath circuit 706), and the output operand memory store section (e.g., executed by the store AGU circuit 708).

FIG. 8 illustrates an example of a tensor program that is decomposed into a plurality of sections. The tensor program may be stored in a memory in communication with the programmable tensor processor 700 and may be executed in the programmable tensor processor 700. In particular, a tensor program can be decomposed into four sections, which, for example, can be represented as a C data-structure, as shown in FIG. 8. For example, the tensor program may be decomposed into an input operand memory loads section, a loop sequencing section, a loop body execution on across functional units section, and an output operand memory store section. In one or more embodiments, the programmable tensor processor 700 executes the SW program of FIG. 8 by executing the components of the SW program on corresponding hardware (HW) devices or sub-circuits of the programmable tensor processor, using a point-to-point streaming paradigm for communication between these circuits. For example, in one or more embodiments, the programmable tensor processor 700 may include at least four components, for example, a tensor input operand load circuit (e.g., including the load AGU circuits 704(1), 704(2)), a loop sequencing circuit (e.g., including the nested loop sequencer circuit 712, the predicate filter circuit 714, and the pending instruction tracker circuit 718), a loop body execution circuit (e.g., including the datapath circuit 706), and a tensor output operand store circuit (e.g., including the store AGU circuit 708) to execute the tensor SW program that is decomposed into four functions.

In one or more embodiments, the data-structure of FIG. 8 may be stored as a descriptor in a memory (e.g., 702, 708) and/or one or more registers. In one or more embodiments, the descriptor may have a next field to create lists of descriptors. In one or more embodiments, the programmable tensor processor 700 may have two or more sets of registers so that the programmable tensor processor 700 can perform computations based on one descriptor while another descriptor is getting initialized by a control process or a direct memory access (DMA). The fields in the tensor program of FIG. 8 are passed to the individual processor circuits (e.g., 704(1), 704(2), 706, 708, 712, 714, 718) and control the behavior of the circuits.

Now returning back to FIG. 7A, the programmable tensor processor 700 will be described in further detail below.

In one or more embodiments, the programmable tensor processor 700 maybe controlled over a descriptor DMA and/or a register interface, e.g., the load/store address sequences (e.g., 730, 732), the loop iteration count (720), and the loop body micro-code (724). The descriptor may be loaded by a descriptor DMA and/or software programming a register interface, initializing the values of the load/store address sequences (e.g., 730, 732), the loop iteration count (720), and the loop body micro-code (724).

The load AGU circuits (e.g., 704(1), 704(2)) of the programmable tensor processor 700 is configured to generate a sequence of addresses and read input tensor operands from the memory (e.g., 702(1), 702(2)) corresponding the generated sequence of addresses. In this case, the address sequence is controlled by the inputs_agu[ ] field from the tensor program of FIG. 8 (e.g., which is a part of the input operand memory loads section of the tensor program). For example, in one or more embodiments, based on receiving the inputs_agu[ ] address generation parameters 730, the load AGU circuits (e.g., 704(1), 704(2)) of the programmable tensor processor 700 generates a sequence of addresses and reads data from an input tensor from the memory (e.g., 702(1), 702(2)) (e.g., reads data from an input tensor from the memory) corresponding the generated sequence of addresses.

The store AGU circuit (e.g., 708) of the programmable tensor processor 700 is configured to generate a sequence of addresses and to write output tensor operands to a memory (e.g., 710). In this case, the address sequence is controlled by the outputs_agu[ ] field from the tensor program of FIG. 8 (which is a part of the output operand memory stores section of the tensor program). For example, in one or more embodiments, based on receiving the outputs_agu[ ] address generation parameters 732, the store AGU circuit 708 of the programmable tensor processor 700 generates a sequence of addresses and writes output data to a tensor allocated in the memory corresponding the generated sequence of addresses.

The nested loop sequencer circuit 712 of the programmable tensor processor 700 iterates the loops in the program and generates a stream of condition codes 722 (e.g., one condition code per inner loop iteration). In this case, the loop sequence is controlled by the loop_iterations [ ] array in the tensor program of FIG. 8. For example, the nested loop sequencer circuit 712 of the programmable tensor processor 700 reads the loop iteration count 720, generates a sequence of condition codes 722, one set of condition codes per inner loop iteration based on the loop iteration count 720.

In one or more embodiments, the number of nested loops is predefined in the programmable tensor processor 700. For example, in the programmable tensor processor 700, in N levels of loops (e.g., N=3), loop iteration count (e.g., the loop iteration count 720) is defined up-front in a program (e.g., a tensor program). In such a case, each loop level has associated first/nfirst, last/nlast predicates (e.g., first0, first1, first2, last0, last1, last2, and the like), and all data operations are expressed as predicated instructions of the inner loop body of the tensor program. In one or more embodiments, the loop iteration count has a set or predefined value (e.g., a programmable value).

The predicate filter circuit 714 of the programmable tensor processor 700 reads the loop body micro-code 724 and filters a subset of the micro-code instructions from the loop body micro-code 724 based on the condition codes 722 from the loop sequencer circuit 712. The micro-code instructions or loop body micro-code 724 may be represented in equivalent predicate instructions. In this case, the unfiltered micro-code (e.g., the loop body micro-code 724) is specified in the inner_body[ ] field of the tensor program of FIG. 8. The predicate filter circuit 714 processes the loop body micro-code 724 and passes the filtered instructions (e.g., the predicated micro-code 726) to the pending instruction tracker circuit 718. For example, the predicate filter circuit 714 of the programmable tensor processor 700 reads the loop body micro-code 724 from the descriptor, filters all instructions that fail the condition check based on the condition codes 722 received from the nested loop sequencer circuit 712, and forwards resulting micro-code for loop body (e.g., the predicated micro-code 726) to the tracking stage (e.g., the pending instruction tracker circuit 718).

For example, in the programmable tensor processor 700, the inner loop iteration micro-code or the loop body micro-code 724 may include a set of INSTR instructions (e.g., instr function "InStr([start], string1, string2, [compare])") in which each instruction has a set of associated attributes that include predicate condition, datapath functional unit allocation, relative cycle allocation, operation code indicating the type of operation to be executed, set of input operands, and output operands from one of the register files.

FIG. 9 illustrates a pseudo code for encoding the instructions of a functional unit, according to one or more embodiments. FIG. 9 illustrates a pseudo code or represents these attributes of an instruction of the inner loop iteration micro-code or the loop body micro-code 724 as a pseudo C structure (e.g., as a pseudocode, although other encoding may be used).

In one or more embodiments, the micro-code (e.g., the loop body micro-code 724) defines the set of inner loop body instructions to be executed in the tensor program (e.g., tensor program of FIG. 8). Each instruction in the micro-code (e.g., the loop body micro-code 724) has an associated cycle annotation indicating the relative position of the instruction in the loop body. A compiler in communication with the programmable tensor processor 700 or a user may guarantee that the instruction cycle assignment is free of hazards (e.g., free of resource conflicts). This is guaranteed by the compiler scheduling the instructions or the user manually scheduling instructions. Cycle assignment will depend on availability of input operations (output operands of preceding instructions and resource conflicts on the function units). In one or more embodiments, multiple instructions can be allocated to the same functional unit (e.g., however, in the same cycle, the predicates are non-overlapping).

For example, in one or more embodiments, in the programmable tensor processor 700, the micro-code (e.g., the loop body micro-code 724) is explicitly scheduled by a compiler in communication with the programmable tensor processor 700 to be free of conflicts for a single iteration of the inner loop of the tensor program (e.g., the tensor program of FIG. 8), so free of intra iteration body hazards (e.g., free of resource conflicts). The micro-code (e.g., the loop body micro-code 724) may explicitly annotate instructions with relative cycles and explicitly annotate the functional unit allocation.

In one or more embodiments, in the programmable tensor processor 700, the micro-code program defining the inner loop body (e.g., the loop body micro-code 724) may be executed in every inner loop iteration. The subset of executed instruction (e.g., the predicated micro-code 726) may be defined by a set of condition codes (e.g., the condition codes 722), which depend on the nested loop iteration counts (e.g., the loop iteration count 720).

As discussed above, Table 1 illustrates a lists of predication codes (e.g., the predicated micro-code 726) that can be used in the programmable tensor processor 700 that supports 3 loop levels. Each instruction in the micro-code (e.g., the loop body micro-code 724) may have an associated predication attribute indicating the loop condition at which the instruction should be executed. Also, as discussed with respect to Table 1, the programmable tensor processor 700 includes even and odd predicates to avoid register allocation conflicts induced by latency differences between functional units.

Now returning back to FIG. 7A, the pending instruction tracker circuit 718 of the programmable tensor processor 700 receives the predicated micro-code 726 from the predicate filter circuit 714 and tracks instructions in an 'issue' queue, where the instructions in the issue queue includes predicated micro-code 726 from the predicate filter circuit 714. Instructions at the head of the queue may be issued to the datapath circuit 706 (e.g., as a very long instruction word bundle as shown as "issue instructions bundle to datapath" 728 of FIG. 7A). Predicated micro-code 726 from the predicate filter circuit 714 may be added to the queue at positions indicated by the micro-code instruction relative issue slots. The instructions (e.g., the predicated micro-code 726) will only be added to the queue if the resulting queue state is free of intra loop iteration hazards free of resource conflicts, else the predicated micro-code 726 from the predicate filter circuit 714 will stall (e.g., the "resulting queue state" may be the same as the "updated queue state" in which there are no resource conflicts with the instructions already in the queue). As soon as all hazardous instructions (e.g., resource conflicts) are removed from the queue, the predicated micro-code 726 from the predicate filter circuit 714 will resume from being stalled and may be accepted and added to the queue including the instructions to be issued to the datapath circuit 706. For example, the pending instruction tracker circuit 718 maintains a table of scheduled instructions and allocated resources like registers, issues a bundle of instructions from the head of the table into the datapath circuit 706 (e.g., as shown as "issue instructions bundle to datapath" 728 of FIG. 7A), shifts the table to remove the issued instructions, accepts and adds a new iteration of micro-codes to the table of scheduled instructions, if such instructions are free of hazards (e.g., free of resource conflicts).

In one or more embodiments, the programmable tensor processor 700 may also include a hardware scheduler (e.g., including the predicate filter circuit 714) for handling filtering of loop body micro-code 724 based on the loop iteration counts 720. In one or more embodiments, the hardware scheduler stalls in case of inter-iteration body hazards (e.g., resource conflicts) and handles adding the filtered instructions (e.g., predicated micro-code 726) from an entire loop-body iteration to the pending instruction queue of the pending instruction tracker circuit 718 (e.g., issuing an entire inner loop body every cycle).

The datapath circuit 706 of the programmable tensor processor 700 will now be described in more detail with respect to FIG. 7B. In one or more embodiments, the datapath circuit 706 includes one or multiple functional units for arithmetic functions or for popping an input value from the load AGU circuits (e.g., 704(1), 704(2)) (e.g., data stream coming out of the load AGU circuits) and one or more register files to store intermediate results. The datapath circuit 706 will stall if the input load values are not available from the load AGU circuits (e.g., 704(1), 704(2)) or if the store AGU circuit 708 cannot accept a new output value.

Figure 7C:
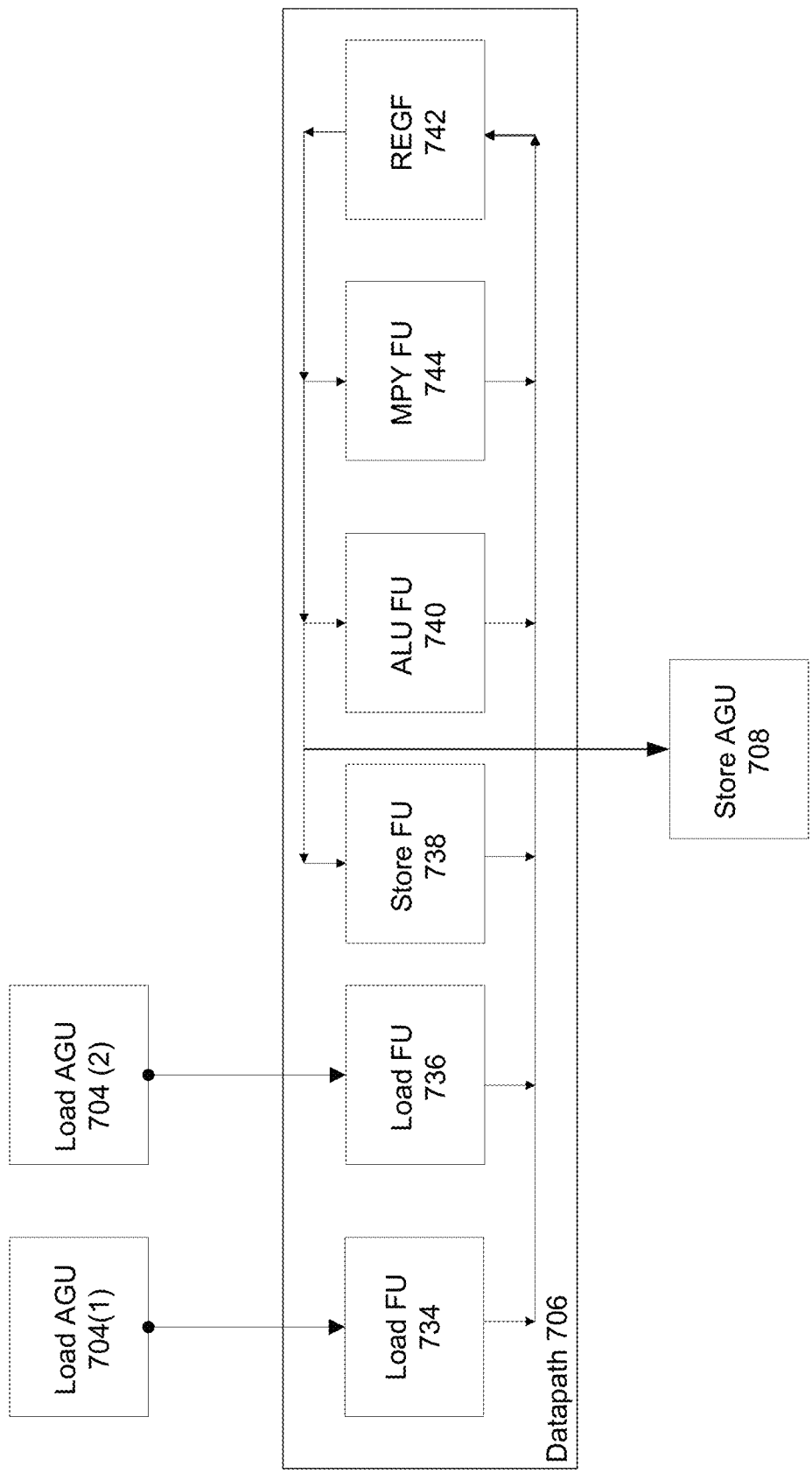
FIG. 7C illustrates an example datapath with a plurality of functional units, according to one or more embodiments.

As illustrated in FIG. 7B, the example datapath circuit 706 includes at least four functional unit circuits (e.g., load functional unit (FU) circuits 734 and 736, a store FU circuit 738, and an arithmetic logic unit (ALU) circuit 740) and a register file REGF circuit 742 for storage. In one or more embodiments, as shown in FIG. 7C, the example datapath circuit 706 may also include a multiplier functional circuit 744. In one or more embodiments, the load FU circuits 734 and 736 of the datapath circuit 706 may load input operands through the load AGU circuits 704(1), 704(2). The ALU circuit 740 and multiplier functional circuit 744 of the datapath circuit 706 may perform tensor operations on the input operands loaded in the load FU circuits 734 and 736 based on the instructions 728 received from the pending instruction tracker circuit 718. The tensor operations include one or more selected from a group of arithmetic operations, look-up table-based operations, multiply and multiply-accumulate operations, transpose and shuffle operations, reduction operations, and/or the like. The store FU circuit 738 of the datapath circuit 706 may store the results of the one or more arithmetic and/or logical operations performed in the ALU circuit 740. The result that is stored in the store FU circuit 738 of the datapath circuit 706 may be transferred to the store AGU circuit 708 of the programmable tensor processor 700. In the embodiment of FIG. 7B, the load and store FU circuits (e.g., 734, 736, 738) stream data to/from the load and store AGU circuits (e.g., 704(1), 704(2), 708).

In one or more embodiments, datapath circuit 706 of the programmable tensor processor 700 may include one or more register files REGF circuit 742.

In one or more embodiments, intermediate results (e.g., during the arithmetic calculations using the ALU circuit 740 of the programmable tensor processor 700) may be stored in the one or more register files REGF circuit 742. In one or more embodiments, different types of register files may be used to store the intermediate results. For example, in one or more embodiments, the one or more register files REGF circuit 742 may separate different data types. For example, a tensor register file including one or more registers, in which each register stores multi-dimensional data (e.g., a matrix), may be used to store intermediate results. As an another example, a vector register file including one or more registers, in which each register stores a one dimensional (1D) array, may be used to store intermediate results. As yet another example, a scalar register file in which each register stores a zero dimensional (0D) scalar value may also be used to store intermediate results. For example, a scalar register file stores values that apply to an entire tensor (0D tensors). A per-channel register file stores vectors (1D tensors) that get broadcasted across other dimensions of the operation. For example, in tensor operations the intermediate results stored in the register files (e.g., the register files REGF circuit 742) may be broadcasted to multi-dimensional data (e.g., higher-dimensional data) by replicating the data over the non-primary axes (e.g., secondary axes or higher dimensional axes than the broadcasted data, etc.), for example, by replicating a scalar value over two dimensions of a matrix or replicating a vector over one of the dimensions of a matrix. In one or more embodiments, the tensor register file temporarily stores intermediate results avoiding intermediate memory accesses. In one or more embodiments, vector registers may store 'per-channel' quantization parameters or per-channel trained parameters. Also, vector registers may store results of reduction or the index of the maximum value across one dimension in a 2D matrix (ARGMAX)(ARG-MAX) operations, common in AI applications.

The programmable tensor processor 700 may efficiently accelerate AI/ML tensor-based operations while retaining flexibility. The programmable tensor processor may be an efficient, low area, high throughput, hardware (e.g., in edge inference processors) or a software for performing efficient and flexible tensor operation acceleration in the ANN. The results of the tensor operations performed in the programmable tensor processor 700 may be stored in a memory based on the address sequences of the output tensors and may be used as an input to a subsequent ANN layer or may be used as an output of the ANN.

Compared to traditional processors, the programmable tensor processor 700 improves system efficiency by avoiding stalls induced by instruction fetch misses by avoiding data dependent control flows, using predefined loop structures and predicated execution of instruction; and by avoiding memory load/store stalls by using predefined address sequences. Avoiding the stalls improves overall tensor processor performance and energy efficiency.

Because the programmable tensor processor 700 provides an efficient and flexible solution to perform the tensor operations in an ANN, the overall efficiency of the ANN may improve significantly as the ANN will take less time to perform each tensor operation without compromising flexibility of use. For example, the programmable tensor processor 700 may be used to train an ANN network or an ANN in a programmable processor, for example, a field programmable gate array (FPGA) device, to speed up the training process of the ANN accelerator or the ANN in the FPGA and in turn increasing speed of the ANN accelerator and/or the FPGA device.

Figure 10:
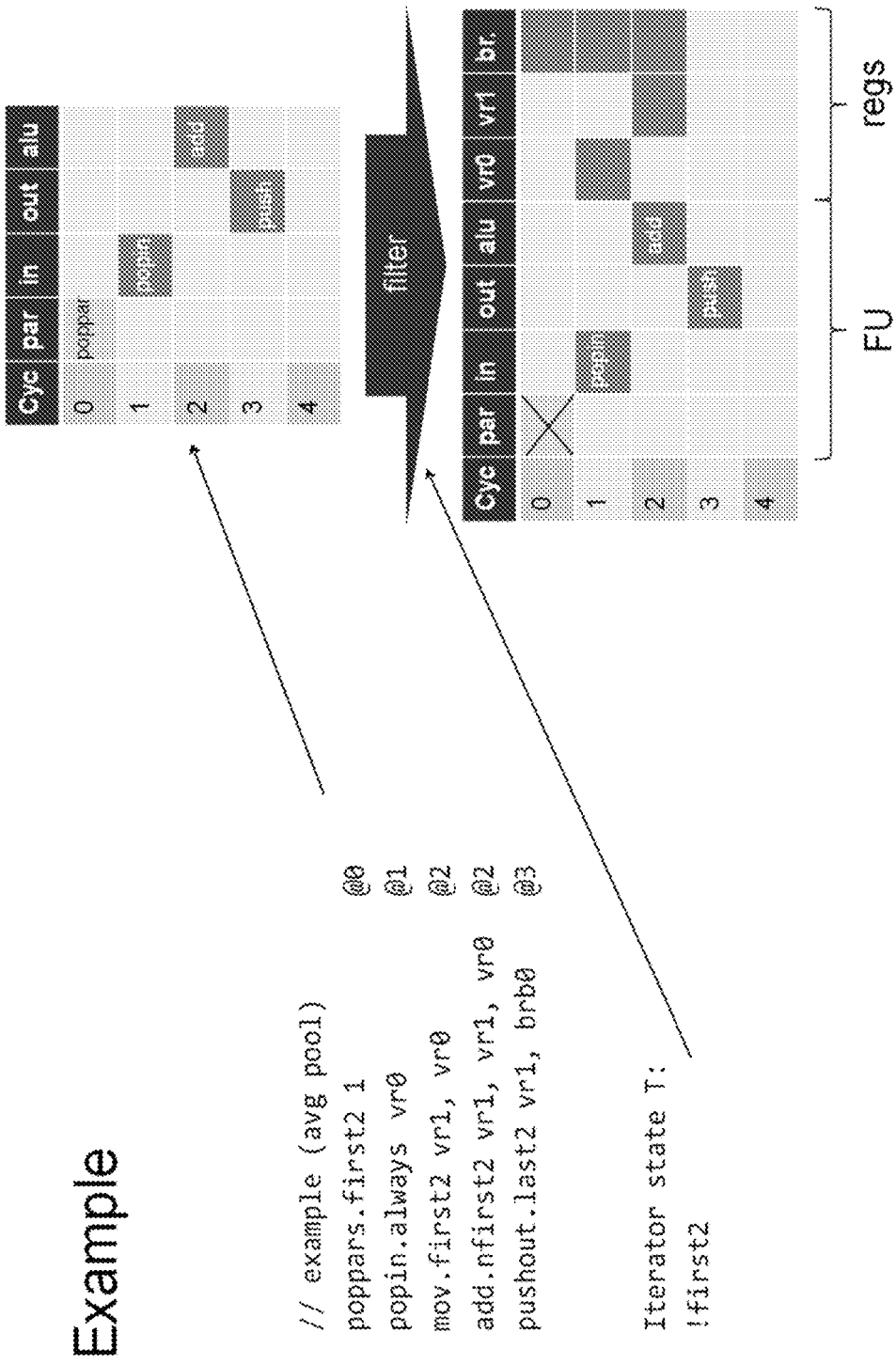
FIG. 10 illustrates how the filter circuit of the programmable tensor processor of FIG. 7A creates a table of instructions by filtering predicated instructions, according to one or more embodiments.

FIG. 10 illustrates a pseudo code to describe how the predicate filter circuit (e.g., 714 of FIG. 7A) of the programmable tensor processor 700 may create a table of instructions to be included in the instruction queue of the pending instruction tracker circuit 718 by filtering the loop body micro-code 724.

For example, in FIG. 10, the input program includes a relative cycle annotation (@1, @2 etc.). In the example of FIG. 10, at time T (or at iterator state T), the loop iterator is not in the first cycle (@0), so the poppars.first2 predicate will fail and the predicate filter circuit 714 will discard the instruction in this iteration. The resulting table (e.g., the instruction table) will only have the remaining instructions. Apart from the instructions, the table (e.g., the instruction table) may include pre-decoded operand information (e.g., to track read-after write register dependencies).

For example, there are three steps to add a new loop iteration to the pending instruction table. First, the bundle at the head of the table is issued into the datapath and the entire table is shifted by one position. Next, new instructions are filtered based on loop iteration count predicates. Then, the filtered instructions are added to the queue, if and only if they do not conflict with pending instructions (e.g., see FIG. 11).

In one or more embodiments, the programmable tensor processor 700 may schedule filtered predicated micro-code to avoid inter-loop iteration hazards (e.g., resource conflicts) . The programmable tensor processor 700 will do so by maintaining an instruction schedule that tracks per clock cycle, for example, the instructions to be executed per functional unit, the pending write operations per register in the register files, and the like.

Figure 11:
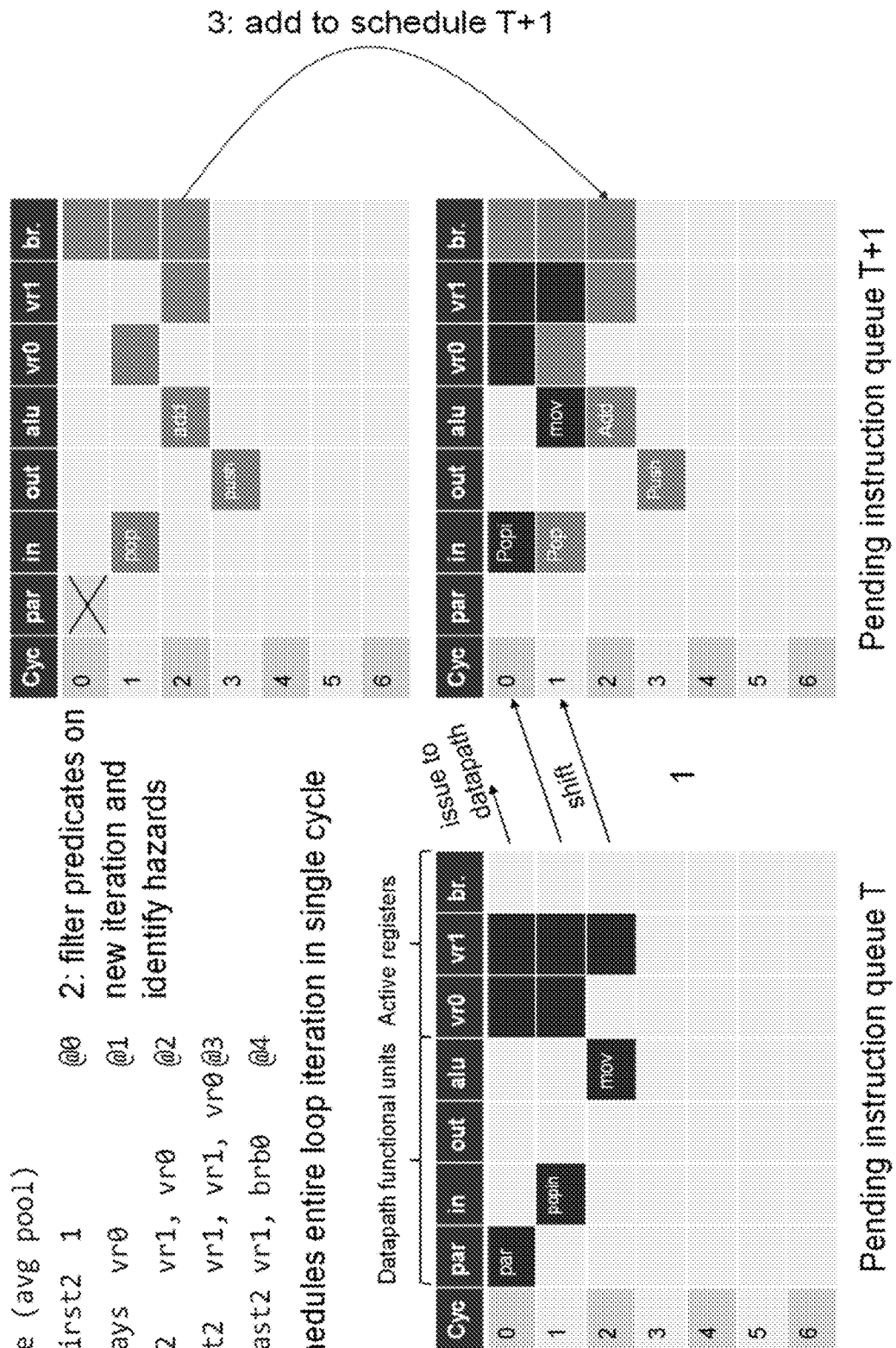
FIG. 11 illustrates how a new set of instruction from the filter is added to the schedule of pending instructions, according to one or more embodiments.

FIG. 11 illustrates how a new set of instruction from the predicate filter circuit 714 of the programmable tensor processor 700 is added to the schedule of pending instructions in the pending instruction tracker circuit 718. For example, in cycle T, the scheduling includes several steps resulting in a new state in cycle T+1. First, (at cycle T) the first instruction bundle from the schedule is issued to the datapath (e.g., the datapath circuit 706) while shifting the schedule by one position, unless the datapath stalls. In the meantime, the filter (e.g., the predicate filter circuit 714) disables instructions with failing predicates as discussed with respect to Table 1. Next, (at cycle T+1) a scheduler (e.g., a hardware scheduler including the predicate filter circuit 714) may add all new instructions to the schedule if there are no hazards (e.g., overlap of instructions (e.g., resource conflicts) in the instruction queue at T+1 would indicate a hazard/conflict).

Figure 12B:
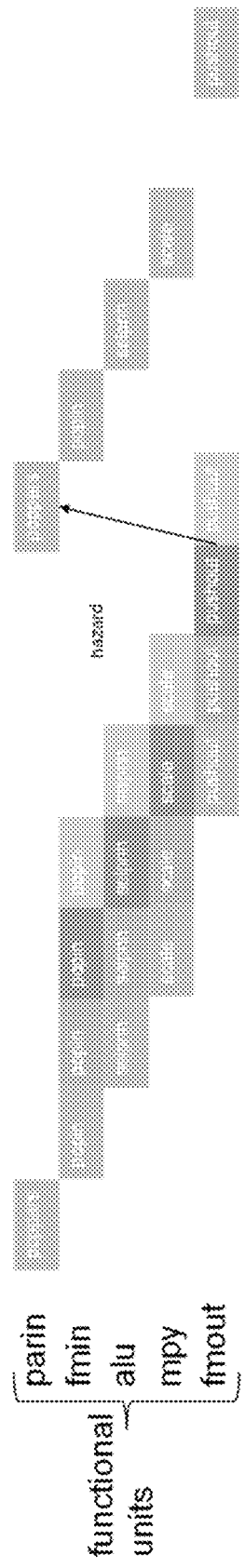
FIG. 12B illustrates the equivalent predicated instruction of the C-pseudocode of PReLU of FIG. 12A and a corresponding instruction queue, according to one or more embodiments.

FIG. 12A illustrates a pseudo code representing a parametric rectified linear unit (PReLU) and also illustrates an instruction schedule. For example, the left hand side of the program in FIG. 12A represents a C-pseudocode of PReLU and the right hand side represents the equivalent predicated instruction. FIG. 12B illustrates the equivalent predicated instruction of the C-pseudocode of PReLU of FIG. 12A and a corresponding instruction queue. As shown in FIG. 12B, a hazard is detected in the instruction queue. In FIG. 12B, the arrow indicates a write-after-read hazard.

Figure 13A:
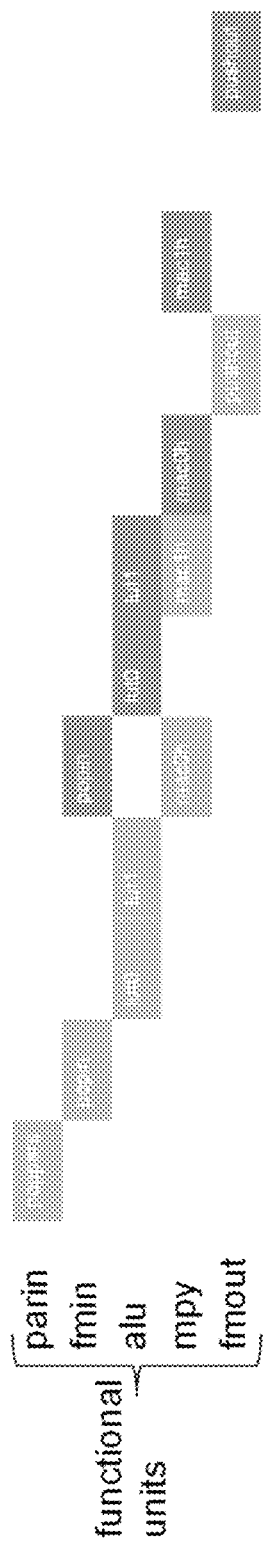
FIG. 13A illustrates a C-pseudocode representing a look-up-table (LUT), according to one or more embodiments.
Figure 13B:
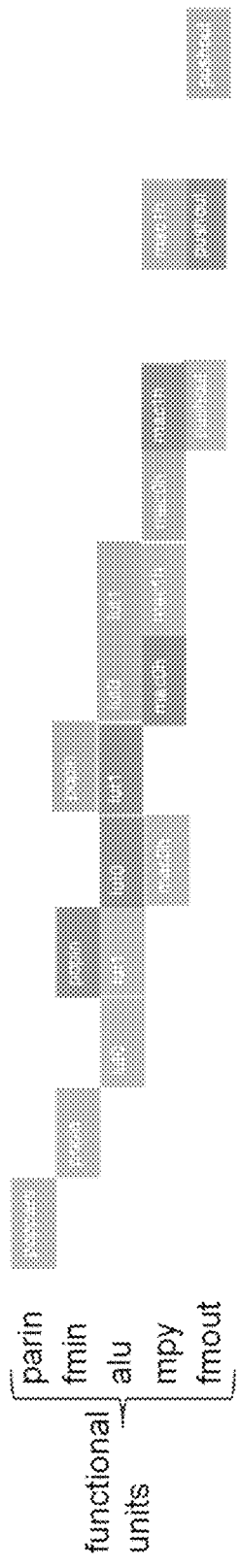
FIG. 13B illustrates the predicated instructions representing the C-pseudocode of FIG. 13A with improved scheduling and a corresponding updated instruction queue with improved scheduling, according to one or more embodiments.

FIG. 13A illustrates a C-pseudocode representing a look-up-table (LUT). For example, FIG. 13A represents predicated instructions representing a LUT program and a corresponding instruction queue. FIG. 13B illustrates the predicated instructions representing the C-pseudocode of FIG. 13A with improved scheduling and a corresponding updated instruction queue with improved scheduling. As shown in FIG. 13B, scheduling is improved by scheduling the "mac1h.always" and "pushout.always" predicated instructions from cycles @6 and @8 to cycles @7 and @9 respectively, resulting in a denser schedule producing one output per two cycles.

FIG. 14 illustrates a tensor operation task descriptor including sections for input tensor loading, loop control, micro-code, and output tensor storing. In this case, two input tensors may be loaded to the load AGU circuits 704(1), 704(2) from the memory based on the address sequences of the input sensors, one output tensor containing the result of the computation in the datapath may be loaded to the store AGU circuit 708 and then stored in the memory based on the address sequences of the output tensors. A scalar register file may also be used to store intermediate results of the computations on the input tensors. In one or more embodiments, a scalar register file may be initialized from the descriptor so that parameters can be passed to the microcode. The computation on the input tensors may be performed in the datapath based on the loop body micro-code. In the micro-code, the "next" field allows creation of descriptor lists, so that multiple operations can be chained.

Figure 15:
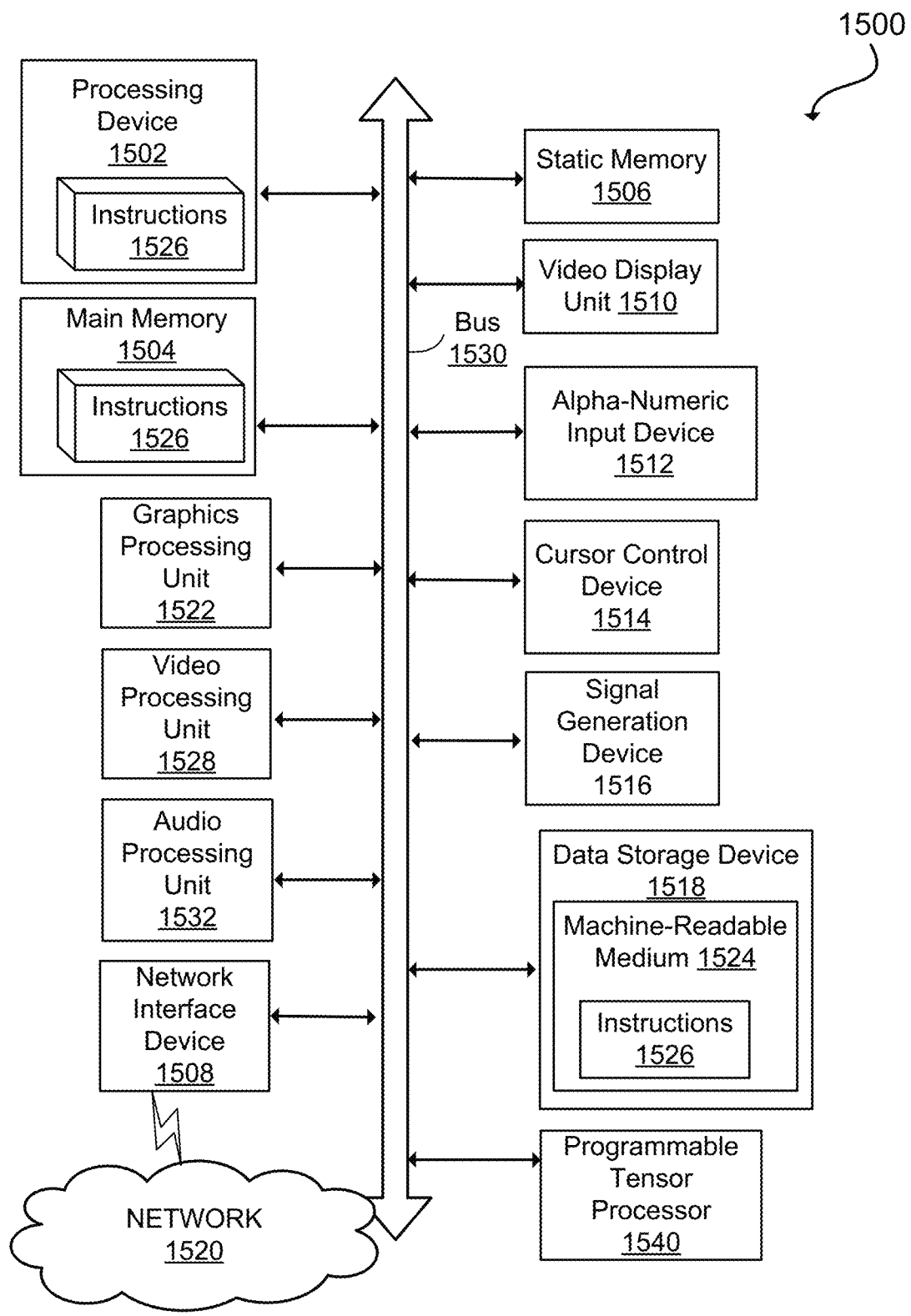
FIG. 15 depicts a diagram of an example computer system in which embodiments of the present disclosure may operate.

FIG. 15 illustrates an example machine of a computer system 1500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1500 includes a processing device 1502, a main memory 1504 (e.g., read-only memory (ROM), flash memory, dynamic random access memory (DRAM) such as synchronous DRAM (SDRAM), a static memory 1506 (e.g., flash memory, static random access memory (SRAM), etc.), and a data storage device 1518, which communicate with each other via a bus 1530.

Processing device 1502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. The processing device 1502 may be configured to execute instructions 1526 for performing the operations and steps described herein.

The computer system 1500 may further include a network interface device 1508 to communicate over the network 1520. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a graphics processing unit 1522, a signal generation device 1516 (e.g., a speaker), graphics processing unit 1522, video processing unit 1528, and audio processing unit 1532.

The computer system 1500 may further include a programmable tensor processor 1540 in accordance with embodiments of the present disclosure, as described above.

The data storage device 1518 may include a machine-readable storage medium 1524 (also known as a non-transitory computer-readable medium) on which is stored one or more sets of instructions 1526 or software embodying any one or more of the methodologies or functions described herein. The instructions 1526 may also reside, completely or at least partially, within the main memory 1504 and/or within the processing device 1502 during execution thereof by the computer system 1500, the main memory 1504 and the processing device 1502 also constituting machine-readable storage media.

In some implementations, the instructions 1526 include instructions to implement functionality corresponding to the present disclosure. While the machine-readable storage medium 1524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1502 to perform any one or more of the methodologies of the present disclosure. The term "machine-readable storage medium" shall accordingly be taken to include, but not be limited to, solid-state memories, optical media, and magnetic media.

A computer-readable design of a streaming tensor processor circuit according to the present disclosure may be included within a library of available pre-designed cells or circuit blocks or circuit portions stored on a computer-readable medium (e.g., in a digital representation of a streaming tensor processor circuit). This allows the design of a streaming tensor processor according to the present disclosure to be placed as a circuit block within a design of an integrated circuit (e.g., a digital representation of the integrated circuit). For example, a streaming tensor processor circuit specified by the computer-readable design may be incorporated into the design of an analog or mixed-signal integrated circuit for a system on chip (SoC).

Specifications for a circuit or electronic structure (which may also be referred to as "instructions, which when executed by a processor, cause the processor to generate a digital representation of the circuit or electronic structure") may range from low-level transistor material layouts to high-level description languages.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, which may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system for executing tensor operations, the system comprising:
   a programmable tensor processor; and
   a memory coupled to the programmable tensor processor, wherein the programmable tensor processor comprises:
      one or more load address generation unit (AGU) circuits configured to generate a first sequence of addresses and read input tensor operands from the memory based on the first sequence of addresses;
      a datapath circuit configured to perform the tensor operations on the input tensor operands based on receiving one or more instructions to determine output tensor operands, the one or more instructions being based on a loop iteration count and loop body micro-code instructions defining a loop body of a tensor program stored in the memory, the loop body micro-code instructions being executed in the programmable tensor processor; and
      a store AGU circuit configured to generate a second sequence of addresses and write the output tensor operands to the memory based on the second sequence of addresses.

2. The system of claim 1, wherein the one or more load AGU circuits are configured to generate the first sequence of addresses based on receiving one or more input address generation parameters based on the tensor program stored in the memory, and to generate the second sequence of addresses based on receiving one or more output address generation parameters based on the tensor program stored in the memory, the first sequence of addresses comprising one or more sequences of addresses.

3. The system of claim 1, wherein the tensor operations comprise one or more selected from a group of arithmetic operations, look-up-table (LUT) based operations, multiply and multiply-accumulate operations, transpose and shuffle operations, and/or reduction operations.

4. The system of claim 1, wherein the tensor program is decomposed into an input operand memory loads section, a loop sequencing section, a loop body microcode executing across functional circuits of the datapath circuit, and an output operand memory store section, wherein the loop sequencing section of the tensor program comprises the loop iteration count of the tensor program and a plurality of predicate instructions representing the loop body micro-code instructions, and wherein the loop iteration count is a set value.

5. The system of claim 4, wherein the first sequence of addresses are generated based on the input operand memory loads section of the tensor program and the second sequence of addresses are generated based on the output operand memory store section of the tensor program.

6. The system of claim 1, wherein the programmable tensor processor further comprises:
   a nested loop sequence circuit configured to iterate loops in the tensor program based on the loop iteration count of the tensor program and to generate a stream of condition codes;
   a predicate filter circuit configured to filter a subset of the loop body micro-code instructions, based on the stream of condition codes from the nested loop sequencer circuit, and to generate filtered instructions comprising corresponding predicate instructions; and
   a pending instruction tracker circuit configured to track the filtered instructions, from the predicate filter circuit, in an instruction queue, and to issue the one or more instructions of the filtered instructions to the datapath circuit, the one or more instructions are at a head of the instruction queue.

7. The system of claim 6, wherein the predicate filter circuit is configured to filter one or more instructions from the loop body micro-code instructions that fail a condition check based on the stream of condition codes received from the nested loop sequencer circuit.

8. The system of claim 6, wherein the pending instruction tracker circuit is further configured to maintain a table of scheduled instructions comprising the instruction queue, to shift the table of scheduled instructions to remove the one or more instructions after the one or more instructions from the head of the instruction queue are issued to the datapath circuit, and to accept and adds a new iteration of the filtered instructions to the table of scheduled instructions, wherein the new iteration of the filtered instructions that are added to the table of scheduled instructions are free of hazards.

9. The system of claim 1, wherein the datapath circuit comprises:
   one or more load functional circuits configured to load the input tensor operands through the one or more load AGU circuits;
   one or more arithmetic-logic functional circuits configured to perform the tensor operations;
   one or more multiplier functional circuits;
   at least one storage circuit configured to store the output tensor operands through the store AGU circuit and intermediate results of the tensor operations; and
   at least one register files circuit to store intermediate results of the tensor operations.

10. A method for executing tensor operations in neural network, the method comprising:
    generating, by a processor, a first sequence of addresses;
    reading, by the processor, input tensor operands from a memory coupled to the processor based on the first sequence of addresses;
    iterating loops in a tensor program stored in the memory and generating a stream of condition codes by the processor;
    filtering, by the processor, a subset of micro-code instructions from loop body micro-code instructions of the tensor program, based on the stream of condition codes and generating filtered instructions;
    performing, by the processor, the tensor operations on the input tensor operands based on one or more instructions of the filtered instructions to determine output tensor operands;
    generating, by the processor, a second sequence of addresses; and
    writing, by the processor, the output tensor operands to the memory based on the second sequence of addresses.

11. The method of claim 10, further comprising:
tracking, by the processor, the filtered instructions in an instruction queue; and
issuing, by the processor, the one or more instructions to a datapath circuit of the processor, the one or more instructions are at a head of the instruction queue.

12. The method of claim 11, further comprising:
maintaining, by the processor, a table of scheduled instructions comprising the instruction queue;
shifting, by the processor, the table to remove the one or more instructions after the one or more instructions from the head of the instruction queue are issued to the datapath circuit; and
accepting and adding, by the processor, a new iteration of the filtered instructions to the table of scheduled instructions, wherein the new iteration of the filtered instructions that are added to the table of scheduled instructions are free of hazards.

13. The method of claim 10, wherein the processor is configured to iterate the loops in the tensor program based on a loop iteration count of the tensor program,
wherein the loop body micro-code instructions defines a loop body of the tensor program and are executed in the processor,
wherein the filtered instructions comprises a plurality of predicate instructions representing the subset of the micro-code instructions that are filtered, and
wherein two or more predicate instructions from among the plurality of predicate instructions are allocated to a same functional circuit at a same cycle based on predicates in the two or more predicate instructions being mutually exclusive.

14. The method of claim 10, wherein the first sequence of addresses are generated based on receiving one or more input address generation parameters based on the tensor program, and wherein the second sequence of addresses are generated based on receiving one or more output address generation parameters based on the tensor program.

15. The method of claim 10, wherein the tensor operations comprise one or more selected from a group of arithmetic operations, look-up-table (LUT) based operations, multiply and multiply-accumulate operations, transpose and shuffle operations, and/or reduction operations.

16. A non-transitory computer readable medium comprising stored instructions, which when executed by a processor, cause the processor to generate a digital representation of a tensor processor circuit comprising:
one or more load address generation unit (AGU) circuits configured to generate a first sequence of addresses and read input tensor operands from a memory coupled to the tensor processor circuit based on the first sequence of addresses;
a datapath circuit configured to perform tensor operations on the input tensor operands based on receiving one or more instructions to determine output tensor operands, the one or more instructions being based on a loop iteration count and loop body micro-code instructions defining a loop body of a tensor program stored in the memory, the loop body micro-code instructions being executed in the tensor processor circuit; and
a store AGU circuit configured to generate a second sequence of addresses and write the output tensor operands to the memory based on the second sequence of addresses.

17. The non-transitory computer readable medium of claim 16, wherein the tensor processor circuit further comprises:
a nested loop sequence circuit configured to iterate loops in the tensor program based on the loop iteration count of the tensor program and to generate a stream of condition codes;
a predicate filter circuit configured to filter a subset of the loop body micro-code instructions, based on the stream of condition codes from the nested loop sequencer circuit, and to generate filtered instructions comprising corresponding predicate instructions; and
a pending instruction tracker circuit configured to track the filtered instructions, from the predicate filter circuit, in an instruction queue, and to issue the one or more instructions of the filtered instructions to the datapath circuit, the one or more instructions are at a head of the instruction queue.

18. The non-transitory computer readable medium of claim 16, wherein the datapath circuit comprises:
one or more load functional circuits configured to load the input tensor operands through the one or more load AGU circuits;
one or more arithmetic-logic functional circuits configured to perform the tensor operations;
at least one storage circuit configured to store the output tensor operands through the store AGU circuit and intermediate results of the tensor operations; and
at least one register files circuit to store intermediate results of the tensor operations.

19. The non-transitory computer readable medium of claim 16, wherein the tensor program is decomposed into an input operand memory loads section, a loop sequencing section, a loop body execution on across functional units section, and an output operand memory store section, wherein the loop sequencing section of the tensor program comprises the loop iteration count of the tensor program and a plurality of predicate instructions representing the loop body micro-code instructions, and wherein the loop iteration count is a set value.

20. The non-transitory computer readable medium of claim 16, wherein the tensor operations comprise one or more selected from a group of arithmetic operations, look-up-table (LUT) based operations, multiply and multiply-accumulate operations, transpose and shuffle operations, and/or reduction operations.

* * * * *